April 17, 1962 N. L. SCHMITZ 3,029,634
DYNAMOMETER
Filed April 20, 1959

INVENTOR.
NORBERT L. SCHMITZ
BY
Christie, Parker & Hale
ATTORNEYS

3,029,634
DYNAMOMETER
Norbert L. Schmitz, Madison, Wis., assignor to Wisconsin Alumni Research Foundation, Madison, Wis., a corporation of Wisconsin
Filed Apr. 20, 1959, Ser. No. 807,527
3 Claims. (Cl. 73—116)

This invention relates to dynamometers, and more particularly, is concerned with apparatus for testing the torque of very small motors at various speeds.

The use of absorption type dynamometers in measuring mechanical power is well known. One of the more convenient means for measuring power is to convert it to electrical power. In the electrical dynamometer, a generator is driven by the device being tested. The generator is arranged with the stator mounted free to revolve but restrained from revolving by a brake arm attached to it and fastened to weighing scales. The force shown on the scales becomes a torque when multiplied by the lever distance from the center of rotation. Power is measured as the torque operating at the rotational speed of the generator shaft.

A problem arises, however, in attempting to use this prior art technique in measuring torque or power developed by small servo motors and the like, which are capable of producing only very small torques and little power. Because of losses due to friction in the generator bearings and in the rotatable mounting of the generator stator, plus windage losses of the generator, the conventional dynamometer is far too insensitive. Any power absorbed in friction or windage in driving the generator is not measured, and if this lost power represents a substantial portion of the power delivered by the motor under test, obviously the accuracy of the measurements is subject to considerable inaccuracy.

The dynamometer of the present invention is arranged ot virtually eliminate all friction torques not inherent in the machine being tested. Thus the apparatus of the present invention is particularly useful in measuring the torque and power of small servo motors. The apparatus provides means of measuring torque and power at various selected speeds of the test device. This is accomplished by the present invention in the following manner:

In brief, the dynamometer test apparatus comprises a supporting frame on which is journaled for rotation a motor mounting member. This member is arranged to hold securely the motor under test in such a position that the shaft of the motor is coaxial with the axis of rotation of the motor mounting member. Electrical power is fed to the motor under test through suitable slip rings on the motor mounting member, and the entire assembly is rotated at any selected speed by a dynamometer drive motor. A brake arm is secured to the shaft of the motor under test which restrains the test motor shaft from rotating. The brake arm is fastened to weighing scales by which the force at the end of the brake arm may be measured. By this arrangement the only bearing friction or windage included in the measurement of torque is the friction or windage of the test motor itself. The windage and friction torque can be determined by measuring the rotor reaction torque with zero excitation on the test motor.

For a more complete understanding of the invention, reference should be had to the accompanying drawings, wherein.

Figure 1:
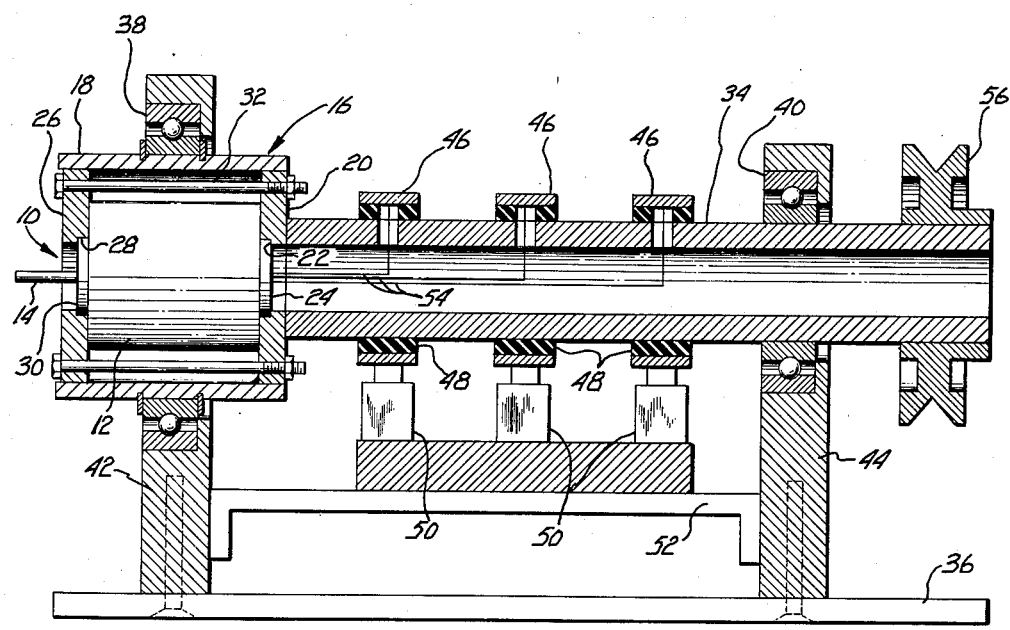
FIG. 1 is a sectional view of the dynamometer test structure.

Referring to the form of the invention as shown in FIG. 1, the numeral 10 indicates generally a motor under test having an external casing 12 and an output shaft 14. In the form of the invention illustrated, the casing 12 is securely clamped in a rotatable motor mount, indicated generally at 16. The rotatable motor mount is preferably constructed with a hollow cylindrical member 18 which surrounds the motor and to which is welded or otherwise secured an annular end plate 20. The end plate is counterbored as indicated at 22 to engage a mounting flange 24 on the back end of the test motor 12. Thus the motor 12 is held in concentric relationship within the cylindrical member 18.

An annular clamping end plate 26 slidably fits within the cylindrical member 18 and is provided with a counterbore 28 which engages a mounting flange 30 on the front of the test motor 10. The motor 10 is securely clamped in position between the end plates 20 and 26 by means of bolts 32, which when tightened draw the end plate 26 inwardly in clamping engagement against the motor 10.

It will be understood that the particular arrangement shown for mounting the test motor is given by way of example only, and may be modified as required, depending upon the general shape and mounting facilities for the particular motors being tested.

A hollow shaft member 34 is welded or otherwise secured to the end plate 20, the shaft 34 being coaxial with the test motor 10. The entire assembly of the motor mount 16 and shaft 34 is rotatably supported from a main frame 36 by a pair of ball bearings indicated at 38 and 40. The ball bearing 38 has its inner race secured to the outside of the cylindrical member 18, and the outer race supported by a mounting bracket 42 secured to the main frame 36. The ball bearing 40 has its inner race secured to the outside of the shaft 34 and its outer race supported by a mounting bracket 44, which in turn is secured to the main frame 36. In this manner the motor 10 is coaxially supported for rotation of the motor casing 12 about the shaft 14.

Electrical connections can be made to the motor 10 through a series of slip rings 46 which are mounted on the shaft 34 and insulated therefrom by insulating sleeves 48. Each of the slip rings is contacted by brush devices, indicated generally at 50, which are supported by any suitable means such as by bracket 52 extending between the brackets 42 and 44. Lead wires 54 from the servo motor 10 are connected to the slip rings 46 to provide proper electrical connections. Any suitable means, such as wire clips (not shown), may be used to provide a quick disconnect between the motor leads and the slip rings for ready removal and replacement of test motors in the dynamometer mounting. A pulley 56 is secured to the end of the shaft 34 by means of which rotation can be imparted to the motor mount.

Figure 2:
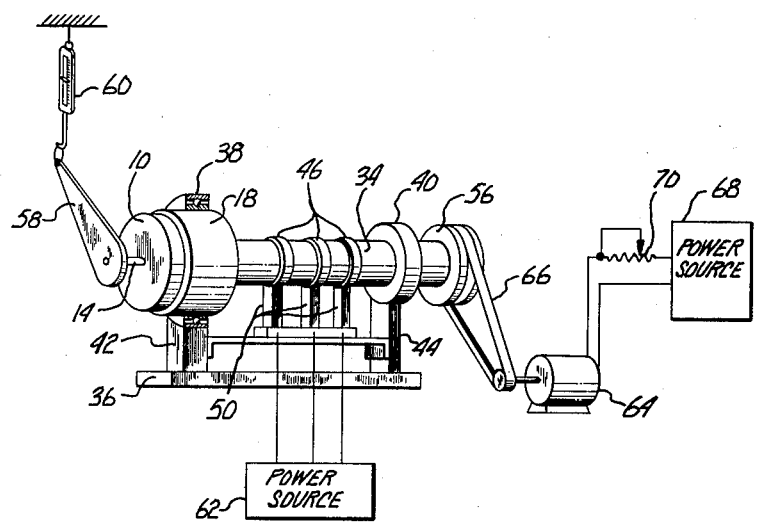
FIG. 2 is a schematic showing of the complete test apparatus.

The entire motor shaft assembly is shown schematically in FIG. 2. In the test arrangement, a brake arm 58 is secured at one end to the shaft 14 of the test motor 10. The other end of the brake arm is fastened to a weighing scale 60. While a spring-type of weighing scale is shown, it will be understood that any type of weighing means may be used having sufficient accuracy for carrying out the required measurements. For very small motors of extremely light torque, sensitive balance scales are preferably employed. The brake arm 58 and weighing scale 60 combine to restrain rotation of the shaft 14.

Power is supplied to the motor 10 from a suitable power source indicated generally at 62 which is connected to the motor 10 through the brushes 50 and the slip rings 46 in the manner described above in connection with FIG. 1. The voltage of the power source 62 may be made adjustable, and suitable voltage and current measuring instruments provided to measure the input power delivered to the test motor 10.

The casing of the test motor 10 is driven at any selected speed by a dynamometer drive motor 64 through a belt 66 engaging the pulley 56. The drive motor 64 is preferably a direct-current shunt wound motor with variable speed control, the motor being energized from a suitable power source 68 through a rheostat control 70. Thus the motor 64 can be adjusted to drive the casing of the test motor 10 at any desired speed, the speed being set, for example, by means of a stroboscope or other means for mesauring rotational speed of the motor mount assembly.

From the above description it will be recognized that no load is imposed on the motor 10 by the dynamometer test apparatus. In the test arrangement, the frictional drag of the test motor bearings adds to the measured torque of the motor, whereas in normal operation, the friction of the motor bearings subtracts from the delivered torque of the motor. The amount of the dynamic friction torque can be readily ascertained by measuring the torque produced by the brake arm 58 with zero excitation on the test motor 10. Thus this source of measurement error can be eliminated by subtracting friction torque from the measured torque.

While in the preferred embodiment above described, the casing of the test motor is clamped and rotated and the shaft secured to the brake arm, it will be appreciated that this condition could be reversed and the shaft rotated and the casing locked against rotation by the brake arm. The essential factor is that, whether the casing is rotated or the shaft is rotated, the test motor be supported directly through the rotated part. This insures that friction and windage losses in the rotatable motor mount are not reflected in the torque measurement of the test motor. With the arrangement as taught, these losses are reflected only as an additional load on the dynamometer drive motor 64 rather than as a load on the test motor 10.

What is claimed is:

1. A dynamometer test apparatus for small motors and the like comprising a supporting frame, a motor mount rotatably supported from the frame for supporting the motor under test, the motor mount securing the motor with the motor shaft coaxial with the axis of rotation of the motor mount, variable speed drive means for rotating the motor mount at any selected speed, means including slip rings on the motor mount for connecting the test motor to an electrical power source, and means for locking the motor shaft against rotation and measuring the shaft torque including a torque arm secured at one end to the test motor shaft and a weighing scale in engagement with the other end of the torque arm.

2. A dynamometer test apparatus for small motors and the like comprising a supporting frame, a motor mount rotatably supported from the frame for supporting the motor under test, the motor mount securing the motor with the motor shaft coaxial with the axis of rotation of the motor mount, variable speed drive means for rotating the motor mount at any selected speed, means for connecting the test motor to an electrical power source, and means for locking the motor shaft against rotation and measuring the shaft torque including a torque arm secured at one end to the test motor shaft and a weighing scale in engagement with the other end of the torque arm.

3. A dynamometer test apparatus for small motors and the like comprising a supporting frame, a motor mount rotatably supported from the frame for supporting the motor under test, the motor mount securing the motor with the motor shaft coaxial with the axis of rotation of the motor mount, drive means for rotating the motor mount, means for connecting the test motor to an electrical power source, and means for locking the motor shaft against rotation and measuring the shaft torque.

References Cited in the file of this patent
UNITED STATES PATENTS

| | | |
|---|---|---|
| 2,445,095 | Winther | July 13, 1948 |
| 2,845,795 | Emmerling | Aug. 5, 1958 |